(12) United States Patent
Qi et al.

(10) Patent No.: US 9,958,608 B2
(45) Date of Patent: May 1, 2018

(54) PASSIVE OPTICAL DIODE ON SEMICONDUCTOR SUBSTRATE

(71) Applicant: Purdue Research Foundation, West Lafayette, IN (US)

(72) Inventors: Minghao Qi, West Lafayette, IN (US); Li Fan, West Lafayette, IN (US); Jian Wang, West Lafayette, IN (US); Leo Tom Varghese, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 0 days. days.

(21) Appl. No.: 15/627,335

(22) Filed: Jun. 19, 2017

(65) Prior Publication Data

US 2017/0285262 A1  Oct. 5, 2017

Related U.S. Application Data

(63) Continuation of application No. 14/382,507, filed as application No. PCT/US2012/060319 on Oct. 15, 2012, now Pat. No. 9,684,127.

(60) Provisional application No. 61/605,913, filed on Mar. 2, 2012.

(51) Int. Cl.
| | |
|---|---|
| *G02F 1/225* | (2006.01) |
| *G02B 6/122* | (2006.01) |
| *G02B 6/12* | (2006.01) |
| *G02B 6/27* | (2006.01) |
| *G02B 6/293* | (2006.01) |

(52) U.S. Cl.
CPC ......... *G02B 6/122* (2013.01); *G02B 6/12007* (2013.01); *G02B 6/2746* (2013.01); *G02B 6/29343* (2013.01)

(58) Field of Classification Search
USPC .......................................................... 385/14
See application file for complete search history.

(56) References Cited

U.S. PATENT DOCUMENTS

| | | |
|---|---|---|
| 6,380,820 B1 | 4/2002 | Sakamoto et al. |
| 2004/0109485 A1 | 6/2004 | Flory et al. |
| 2006/0013273 A1 | 1/2006 | Menon et al. |
| 2009/0136181 A1 | 5/2009 | Vollmer et al. |

OTHER PUBLICATIONS

H. A. Haus, Waves and Fields in Optoelectronics, Prentice-Hall, 1984, pp. 56-61, Englewood Cliffs, NJ.

(Continued)

*Primary Examiner* — Eric Wong
(74) *Attorney, Agent, or Firm* — Maginot, Moore & Beck LLP

(57) ABSTRACT

A method of fabricating an optical device includes forming on a semiconductor substrate a first optical cavity, a second optical cavity, a first light guide and a second light guide. The first light guide has an input, and is optically coupled to the first optical cavity by a first coupling strength. In addition, the first light guide is optically coupled to the second optical cavity by a second coupling strength. The second light guide has an output, and is coupled to the second optical cavity by a third coupling strength. The first coupling strength is greater than the second coupling strength, and the third coupling strength is greater than the second coupling strength.

20 Claims, 4 Drawing Sheets

(56) References Cited

OTHER PUBLICATIONS

L. Bi et al., On-Chip Optical Isolation in Monolithically Integrated Non-Reciprocal Optical Resonators, Nature Photonics, Dec. 2011, pp. 758, vol. 5.

S. F. Mingaleev et al., Nonlinear Transmission and Light Localization in Photonic Crystal Waveguides, J. Opt. Soc. Am. B 200, pp. 2241, vol. 19.

K. Gallo et al., All-Optical Diode in a Periodically Poled Lithium Niobate Waveguide, Applied Physics Letters, 2001, pp. 314, vol. 79, No. 3.

M. Soljacic et al., Nonlinear Photonic Crystal Microdevices for Optical Integration, Optics Letters, 2003, pp. 637, vol. 28, No. 8, Optical Society of America.

S. K. Ibrahim et al., Non-Magnetic 30 dB Integrated Optical Isolator in III/V Material, Electronics Letters, 2004, pp. 1293, vol. 40, No. 20.

J. Hwang et al., Electro-Tunable Optical Diode Based on Photonic Bandgap Liquid-Crystal Heterojunctions, Nature Materials, 2005, pp. 383, vol. 4, Nature Publishing Group.

S. Manipatruni et al., Optical Nonreciprocity in Optomechanical Structures, Physical Review Letters, 2009, pp. 213903, vol. 102, The American Physical Society.

Z. Yu et al., Complete Optical Isolation Created by Indirect Interband Photonic Transitions, Nature Photonics, 2009, pp. 91, vol. 3, Macmillan Publishers Limited.

B. E. Little et al., Microring Resonator Channel Dropping Filters, Journal of Lightwave Technology, 1997, pp. 998, vol. 15, No. 6, IEEE.

Q. Xu et al., Micrometre-Scale Silicon ELectro-Optic Modulator, Nature Letters, 2005, pp. 325, vol. 435, Nature Publishing Group.

S. Xiao et al., Compact Silicon Microring Resonators with Ultralow Propagation Loss in the C Band, Opt. Express 2007, pp. 14467, vol. 15, Birck and NCN Publications.

M. H. Khan et al., Ultrabroad-bandwidth arbitrary radiofrequency waveform generation with a silicon photonic chip-based spectral shaper, Nature Photonics, 2010, pp. 117, vol. 4, Macmillan Publishers Limited.

M. Soljacic et al., Optical bistable switching in nonlinear photonic crystals, Physical Review E, 2002, pp. 055601, vol. 66, The American Physical Society.

P. E. Barclay et al., Nonlinear response of silicon photonic crystal micresonators excited via an integrated waveguide and fiber taper, Optics Express, 2005, pp. 801, vol. 13.

Q. Xu et al., Carrier-induced optical bistability in silicon ring resonators, Optics Letters, 2006, pp. 341, vol. 31, No. 3, Optical Society of America.

V. R. Almedia et al., Optical bistability on a silicon chip, Optics Letters, 2004, pp. 2387, vol. 29, No. 20, Optical Society of America.

M. Dinu et al., Third-order nonlinearities in silicon at telecom wavelengths, Applied Physics Letters, 2003, pp. 2954, vol. 82, No. 18, American Institute of Physics.

A. C. Turner-Foster et al., Ultrashort free-carrier lifetime in low-loss silicon nanowaveguides, Optics Express, 2010, pp. 3582, vol. 18, No. 4, Optical Society of America.

T. Barwicz et al., Microring-Resonator-Based Add-Drop Filters in SiN: Fabrication and Analysis, Optics Express, 2004, pp. 1437, vol. 12, No. 7, Optical Society of America.

Espinola et al., Magneto-optical nonreciprocal phase shift in garnet/silicon-on-insulator waveguides, Optics Letters, May 1, 2004, pp. 941-943, vol. 29, No. 9, Optical Society of America.

Zaman et al., Broadband Integrated Optical Isolators, Applied Phys. Letters, 2007, pp. 90, 023514, IEEE.

Rostami, Piecewise linear integrated optical device as an optical isolator using two-port nonlinear ring resonators, Optics & Laser Technology, 2007, 1059-1065, vol. 39, Elsevier Ltd.

Kang et al., Reconfigurable light-driven opto-acoustic isolators in photonic crystal fibre, Aug. 14, 2011, pp. 549, vol. 5, Nature Photonics.

Xiao et al., Low-power Light Control with Light in High Q/V Silicon Microring Resonators, Conf. Lasers and Electro-Optics, 2008, CTuGG6, IEEE.

Uesugi et al., Investigation of optical nonlinearities in an ultra-high-Q Si nanocavity in a two-dimensional photonic crystal slab, Opt. Express, 2006, pp. 377, vol. 14, No. 1, Optical Society of America.

Sun et al., Low-power optical bistability in a free-standing silicon ring resonator, Apr. 2010, pp. 1124-1126, vol. 35, No. 8, Optics Letters.

Chen et al., Third-Order Dispersion and Ultrafast-Pulse Propagation in Silicon Wire Waveguides, IEEE Photonics Technology Letters, 2006, pp. 2617-2619, vol. 18, No. 24, IEEE.

Li Fan et al., An All-Silicon Passive Optical Diode, Science. Jan. 27, 2012, p. 447-450, vol. 335, No. 6067.

International Search Report for PCT/US2012/060319, dated Jul. 26, 2013, KIPO.

PASSIVE OPTICAL DIODE ON SEMICONDUCTOR SUBSTRATE

This application is a continuation of U.S. patent Ser. No. 14/382,507, filed Sep. 2, 2014, which is a 371 National Phase application of the PCT/US2012/060319, filed Oct. 15, 2012, which claims the benefit of U.S. Provisional Patent Application Ser. No. 61/605,913, filed Mar. 2, 2012, which is incorporated herein by reference.

GOVERNMENT RIGHTS

This invention was made with government support under HDTRA1-10-1-0106-awarded by the Defense Threat Reduction Agency; RR026273 awarded by the National Institutes of Health; ECCS-0925759 awarded by the National Science Foundation; and FA9550-08-1-0379 awarded by the United States Air Force. The government has certain rights in the invention.

FIELD OF THE INVENTION

The present invention relates to optical communication components, and more particularly, to optical diodes.

BACKGROUND

A device allowing nonreciprocal transmission, or in other words, transmission in one direction and blocking in the other), is a fundamental building block in information processing. Nonreciprocal transmission is sometimes referred to as the "diode effect". In electrical system, nonreciprocal transmission has been realized in integrated circuits by a p-n junction in a semiconductor device, or in other words, a common diode.

However, in the field of optics, nonreciprocal transmission is inherently difficult to accomplish, due to the time-reversal symmetry of the light-matter interaction. Prior attempts to achieve optical nonreciprocal transmission have included those based on the magneto-optic effect, as discussed, for example, in R. L. Espinola et al, *Magneto-Optical Nonreciprocal Phase Shift in Garnet/Silicon-on-Insulator Waveguides*, 29 *Opt. Lett.* 941 (2004). Others attempts include those based on optical non-linearity as discussed, for example, in S. F. Mingaleev, et al., *Nonlinear Transmission and Light Localization in Photonic-Crystal Waveguides*, 19 *J. Opt. Soc. Am. B* 2241 (2002). Still other attempts have involved electro-absorption modulation, cholesteric liquid crystals, optomechanical cavities, indirect interband photonic transitions, and opto-acoustic effects.

While many of these attempts have achieved optical nonreciprocal transmission, they have limitations. Specifically, none of these attempts have achieved a CMOS-compatible passive optical diode with a footprint and functionality analogous to p-n junctions, for use at near infrared light. Near infrared light is the wavelength choice for silicon photonics.

There is a need, therefore, for an optical diode, or optical nonreciprocal transmission device, that operates at near infrared light that is passive, and has a reduced footprint and is CMOS-compatible.

SUMMARY

The present invention address the above needs, as well as others, by providing a device having asymmetrical coupling between two light guides and an optical cavity that is capable of storing light, such that the device transmits light in a first direction with much higher power than in the opposite direction. The asymmetrical coupling exploits thermal effects in the semiconductor material to change the resonant wavelength of the optical cavity depending on the direction of the light travel. The change in resonant wavelength results in a nonreciprocal device response.

A first embodiment is a method of fabricating an optical device that includes a first optical cavity, a second optical cavity, a first light guide and a second light guide. Each of the first and second optical cavities is formed on a semiconductor substrate, and is configured to store light. The first light guide has an input, and is optically coupled to the first optical cavity by a first coupling strength. In addition, the first light guide is optically coupled to the second optical cavity by a second coupling strength. The second light guide has an output, and is coupled to the second optical cavity by a third coupling strength. The first coupling strength is greater than the second coupling strength, and the third coupling strength is greater than the second coupling strength.

A second embodiment is a method of fabricating an optical device that includes an optical cavity and first and second light guides. The optical cavity is formed on the semiconductor substrate, and is configured to store light. The first light guide is optically coupled to the optical cavity by a first coupling strength, and has an input coupling. The second light guide has an output coupling, and is optically coupled to the second optical cavity by a second coupling strength. The second coupling strength is greater than the first coupling strength. At least a first wavelength of light propagates from the input coupling to the output coupling with a first attenuation, and the first wavelength of light propagates from the output coupling to the input coupling with a second attenuation that is greater than the first attenuation.

The difference in gap widths results optical energy having different effects on the micro-ring resonant wavelength, dependent on the direction of travel of the light signal. In the other embodiments, the asymmetrical coupling between the light guides and the light storage cavity provide the same effects. It is this feature that can allow for diode-like operation.

Another embodiment of the invention is a method of fabrication of any of the optical devices described above.

The features and advantages of the embodiments described herein will become more readily apparent to those of ordinary skill in the art by reference to the following detailed description and accompanying drawings.

DETAILED DESCRIPTION

Figure 1:
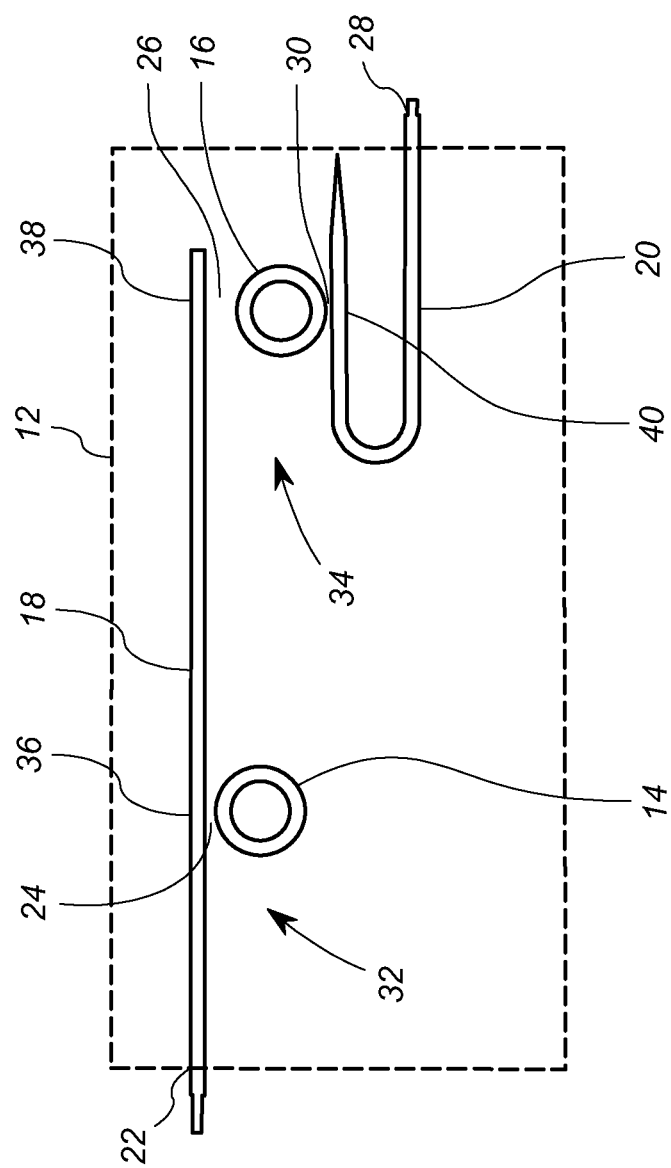
FIG. 1 shows a schematic diagram of an optical component according to a first exemplary embodiment of the invention.

FIG. 1 shows a schematic diagram of an optical component 10 that may be employed as an optical diode in accordance with at least one embodiment of the invention. The optical component 10 includes a semiconductor substrate 12 on which are formed a first optical cavity in the form of a first micro-ring resonator 14, a second optical cavity in the form of a second micro-ring resonator 16, a first light guide in the form of a first waveguide 18 and a second light guide in the form of a second waveguide 20.

The micro-ring resonators 14, 16 are configured to resonate light at a resonant frequency as is known in the art. Each of the first micro-ring resonator 14 and second micro-ring resonator 16 in this embodiment is formed as single crystal silicon on top of an $SiO_2$ substrate 12. Each micro-ring resonator 14, 16 in this embodiment has a cross-sectional thickness of 500 nm, a cross-sectional width or height of 250 nm, and a radius of 5 μm.

It will be appreciated that in other embodiments, either or both of the first micro-ring resonator 14 and/or the second micro-ring resonator 16 may be replaced by other forms of light cavities that are formed on the semiconductor substrate 12 and are configured to store light and increase an electrical field in a localized region. To this end, the micro-rings 14, 16 may suitably be replaced by other resonators, such as waveguides in the shapes of racetracks and the like. Alternatively, the micro-rings 14, 16 may be replaced by optical traps, such as those formed by a photonic crystal.

Each of the first waveguide 18 and the second waveguide 20 is a length of waveguide formed on the semiconductor substrate 12. The waveguides 18, 20 can be replaced however, by other devices that allow light to travel through it. The light guides 18, 20 may suitably be any optical waveguide such as a wire waveguide, rib waveguide, tapered fibers or the like. In the embodiment described herein, however, the waveguides 18, 20 are waveguides formed of single crystal silicon on top of a $SiO_2$ substrate 12.

The first waveguide 18 has an input port 22 that forms the input port of the device 10. The input port 22 has a coupling for receiving optical signals from a source, such as an optical circuit, not shown in FIG. 1. To this end, the input port 22 may suitably comprise a diffraction grating. The first waveguide 18 is optically coupled to the first micro-ring resonator 14 by a first coupling strength. To this end, the first waveguide 18 is separated from the first micro-ring resonator 14 at its closest point 36 by a first gap 24 having a first gap width G1. In addition, the first waveguide 18 is optically coupled to the second micro-ring resonator 16 by a second coupling strength. To this end, the first waveguide 18 is separated from the second micro-ring resonator 16 at its closest point 38 by a second gap 26 having a second gap width G2. The point 36 at the first gap 24 is disposed between the input port 22 and the point 38 at the second gap 38.

The second waveguide 20 has an output port 28 that forms the output port of the device 10. The output port 28 may suitably comprise a diffraction grating. The second waveguide 20 is optically coupled to the second micro-ring resonator 16 by a third coupling strength. To this end, the second waveguide 20 is separated from the second micro-ring resonator 16 at its closed point 40 by a third gap 30 having a third gap width G3.

In general, the waveguides 18, 20 (or alternative light guides) and the micro-ring resonators 14, 16 (or alternative light cavities or traps) are arranged such that the first coupling strength is greater than the second coupling strength, and that the third coupling strength is greater than the second coupling strength. As will be discussed below, it is this relationship of coupling strengths that facilitates diode-like operation of the optical device 10.

In this embodiment, the waveguides 18, 20 have similar dimensions and the micro-ring resonators 14, 16 have the similar dimensions. In particular, each of the first waveguide 18 and the second waveguide 20 in this embodiment is formed of single crystal silicon on top of an $SiO_2$ substrate 12. In such an embodiment, the optical component 10 may readily be fabricated using CMOS techniques on a silicon-on-insulator (SOI) substrate. Each of the first and second waveguides 18, 20 in this embodiment has a cross-sectional width of 500 nm, and a cross-sectional thickness (or height) of 250 nm.

To achieve the relative coupling strengths described above, the gap width G1 (between the first waveguide 18 and the first micro-ring resonator 14 is smaller than the gap width G2 between the first waveguide 18 and the second resonator 16. Moreover, the gap width G3 between the second waveguide 20 and the second resonator 16 is smaller than the gap width G2 between the first waveguide 18 and the second resonator 16.

It will be appreciated that in this embodiment, the first waveguide 18 and the first micro-ring resonator 14 are in the form an optical notch filter 32. Similarly, the first waveguide 18, the second waveguide 20 and the second micro-ring resonator 16 are in the form of an add-drop filter (ADF) 34. The input port 22 of the first waveguide 18 forms the input of the notch filter 32. The output of the notch filter 32 forms the input of the ADF 34, and the output port 28 of the second waveguide 20 forms the output of the ADF 34.

In general, the difference in gap widths G2 and G3 facilitates a redshift in the resonant wavelength of the second micro-ring 16 in the reverse bias direction (light signal received on the second waveguide 20 from the output port 28) while not facilitating a redshift in the resonant wavelength of the second micro-ring 16 in the forward bias direction (light signal received on the first waveguide 18 from the input port 22). This feature allows the device 10 to transfer a wavelength of interest at a lower attenuation in the forward bias direction than in the reverse bias direction.

In forward-bias operation, light of sufficient power, such a 85 mW, is applied to the input port 22, and observed at the output port 28 at a wavelength $\lambda_0=1630$ nm. In this embodiment, the nominal resonant wavelength of both of the micro-rings 14 and 16 occurs at a wavelength of 1630 nm. As a result, the notch filter 32 has a nominal stop band of around 1630 nm, and the ADF filter 34 has a pass band that includes 1630 nm.

The input light signal is coupled via the first gap 24 into the first micro-ring 14, where energy is accumulated at the resonant wavelength thereof. As energy accumulates in the first micro-ring 14, the silicon heats. As a consequence, due to thermal-optical effects, the resonant wavelength of the micro-ring 14 red-shifts such that the wavelength of interest $\lambda_0$ is no longer in the stop band. Thus, when a signal of sufficient power is received at the input port 22, the notch filter 32 does not significantly attenuate the signal power of the wavelength of interest $\lambda_0$.

Figure 2:
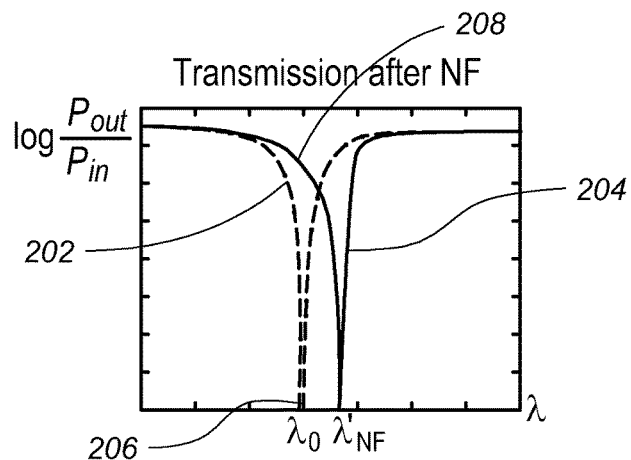
FIG. 2 shows wavelength response curves of the notch filter of the optical component of FIG. 1 under different conditions.

Referring to FIG. 2, a power versus wavelength graph of the notch filter 32 is shown. The curve 202 shows the nominal power versus wavelength of the notch filter 32, such as under low power (e.g. 85 nW), and the curve 204 shows versus wavelength of the notch filter 32 under higher power (85 mW). As shown in FIG. 2, the 85 mW input light signal causes the stop band 206 of the notch filter 32 to shift from the nominal wavelength $\lambda_0$ to a higher wavelength.

Referring again to FIG. 1, as a result of the red-shift of the resonant wavelength of the first micro-ring resonator 14 (and hence the stop band of the notch filter 32), light at the wavelength of interest, $\lambda_0$, passes through the notch filter 32 at a relatively high power. This is shown by the level 208 of the curve 204 at $\lambda_0$ of FIG. 2.

The "notch filtered" light signal is received (by virtue of continued propagation along the first waveguide 18) at the input of the ADF 34 and the point 38 of the waveguide 18. As discussed above, the notch filtered light signal has a power spectrum similar to the curve 204 of $\lambda_0$ of FIG. 2. The notch filtered light signal is coupled from the first waveguide 18 to the second micro-ring resonator 16 via the second gap 26. Because the second gap 26 is larger than the first gap 24, much less overall optical energy of the light signal is coupled into the second micro-ring 16 of the ADF 34. Because the light signal within the second micro-ring 16 is much less powerful than the input light signal coupled into the first micro-ring 14, the accumulated energy in the second micro-ring 16 is not sufficiently powerful to cause a red-shift in the resonant wavelength of the second micro-ring 16 and hence the ADF 32. As with normal ADF operation, the light signal within the second micro-ring 16 is coupled onto the second waveguide 20. The signal on the second waveguide 20 passes to the output port 28 as the output signal.

Figure 3:
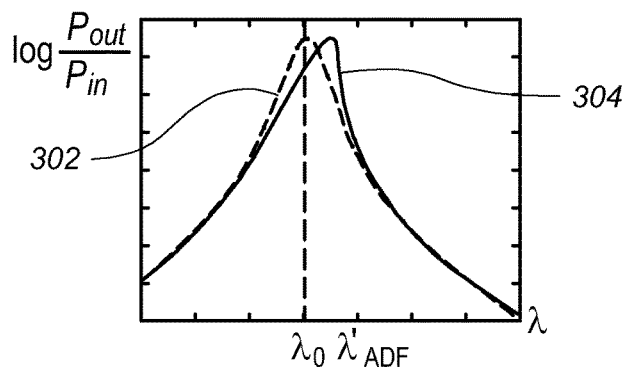
FIG. 3 shows wavelength response curves of the ADF filter of the optical component of FIG. 1 under different conditions.

Because the resonant wavelength of the second micro-ring 16 is $\lambda_0$, the light signal coupled out of the second micro-ring 16 will have a relatively high power at $\lambda_0$. Referring to FIG. 3, a power spectrum of the response of the ADF 34 is shown. In particular, the curve 302 shows the nominal wavelength response curve of the ADF 34. The curve 304, discussed further below, shows the wavelength response curve of the ADF 34 when the second micro-ring 16 receives a higher power optical signal and experiences a red-shift of its resonant wavelength.

Figure 4:
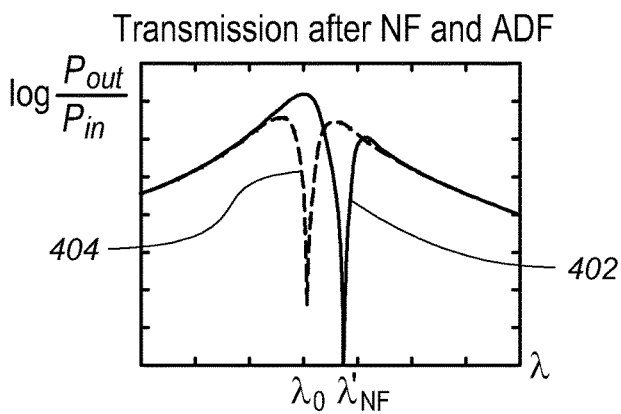
FIG. 4 shows wavelength response curves of the optical component of FIG. 1 under different conditions.

With reference to FIGS. 2 and 3, it can be seen that the response of the optical device 10, when receiving 85 mW of optical power at the first port 22, has a response curve roughly equal to the combination of the curve 204 of FIG. 2, where the notch filter 32 has experienced a red-shift in its resonant (and stop band) wavelength, and the curve 302 of FIG. 3, where the ADF 34 has not experienced a red-shift in its resonant (and pass band) wavelength. For example, FIG. 4 shows a wavelength response spectrum 402 of the optical device 10 that represents the combination of the curves 204 of FIGS. 2 and 302 of FIG. 3. In other words, FIG. 4 shows the response spectrum 402 of the optical device 10 under forward bias conditions, when sufficient optical power is received at the first port 22.

As illustrated by the curve 402 of FIG. 4, the power at the wavelength $\lambda_0$ is at a first level that is relatively high in comparison to other wavelengths. This represents the diode-on, forward bias transmission of the light signal by the optical device 10 at the wavelength $\lambda_0$. By contrast, as will be discussed below, the optical device 10 provides a substantially lower power at the wavelength $\lambda_0$ when a signal of equal power is received instead at the output port 28, in reverse bias direction. For example, FIG. 4 shows a curve 404 of the power spectrum at the first port 22 when an 85 mW optical signal is received at the output port 28. It can be seen that the power level at the wavelength $\lambda_0$ is much lower in reverse bias.

In particular, when an optical signal is received at the output port 28, it propagates through the second waveguide 20 and is coupled into the micro-ring 16 through the third gap 30. Because the third gap 30 is smaller than the second gap 26, more energy of the received light signal accumulates in the second micro-ring 16 of the ADF 34 in the reverse direction. This higher level of energy causes the second micro-ring 16 to heat up, resulting in a red-shift in the resonant wavelength. As with normal ADF operation, the micro-ring 16 couples the ADF filtered signal onto the first waveguide 18.

Referring to FIG. 3, as discussed above, the curve 304 represents the response curve of the ADF 34 under red-shift conditions caused by the application of an 85 mW optical signal in reverse bias, or in other words, received at the output port 28. Accordingly, the optical signal coupled onto the second waveguide 20 will have a slightly reduced power at the wavelength $\lambda_0$. Moreover, because of the relatively large second gap 26 between the second micro-ring 16 and the first waveguide 18, the overall power of the optical signal coupled onto the first wave guide 18 is significantly reduced. The reduced power signal propagates toward the notch filter 32 and hence toward in the input port 22.

The reduced power signal is coupled via the first gap 24 into the first micro-ring 14. Because the overall power is reduced in the optical signal, the accumulated optical energy in the first micro-ring 14 is not sufficient to cause a red-shift of the resonant wavelength (and hence stop band of the notch filter 32). As a consequence, the notch filter 32 has the response substantially the same as the nominal response curve 202 of FIG. 2. As can be seen in FIG. 2, the notch filter 32 with the nominal response curve 202 significantly attenuates the wavelength component at the wavelength $\lambda_0$.

Thus, the output signal at the first port 22 of the reverse bias signal (received at the output port 28) will have a response curve that is a combination of the curve 304 of FIG. 3 and the curve 202 of FIG. 2. This combined response curve is shown as the curve 404 of FIG. 4. As illustrated in the response curve 404 of FIG. 4, the power level at $\lambda_0$ is substantially reduced with respect to the remainder of the wavelengths. Accordingly, the same power input signal of 85 mW will produce a much lower power at $\lambda_0$ in reverse bias (input at the output port 28) than in forward bias (input at the input port 22). Accordingly, the optical device 10 demonstrates optical nonreciprocity at the wavelength $\lambda_0$, due in large part to the asymmetrical coupling strengths between the second micro-ring 16 and each of the first and second waveguides 18, 20, as well as the stronger coupling of the first waveguide 18 to the first micro-ring 14 as compared to the coupling of the first waveguide 18 to the second micro-ring 16.

It will be appreciated that while the various coupling strengths discussed above in this embodiment have been achieved by varying the gap widths, another way to achieve different coupling strengths as describe above is to employ different effective refractive indices of the waveguides 18, 20 at the points 36, 38 and 40 (with or without changing the gap), or to employ different refractive indices of the micro-rings at locations near the gaps 24, 26 and 28.

Employing different refractive indices may be carried out by changing the physical dimensions of the waveguides 18, 20 at points 36, 38 and 40, or changing the physical dimensions of the micro-rings 14, 16 adjacent the gaps 24, 26 and 30. The different refractive indices of the waveguides 18, 20 and/or micro-rings 14, 16 near the gaps 24, 26 and 30 may also be achieved using different materials having different effective refractive indices, or employing an asymmetric overcladding or undercladding around the gaps 24, 26 and 30 to locally change the strength of coupling.

In any event, the above-described element may be readily fabricated on an SOI substrate using normal CMOS fabrication techniques. As will be discussed below, the silicon waveguide may be formed using electron beam lithography and reactive ion etching techniques.

It will also be appreciated with reference to FIG. 3, that at least some non-reciprocity of signals at the wavelength $\lambda_0$ can be achieved within only the ADF 34, or in other words, with only the first waveguide 18, the second micro-ring 16 and the second waveguide 20. However, improved non-reciprocity (larger attenuation difference between forward and reverse bias) may be with the addition of the notch filter 32 as discussed above.

One of the important features of the optical device 10 is the matching of the resonant wavelengths of the two high Q filters 32, 34 when they are operating in the linear mode, i.e., with relatively low incident power (such as 85 mW). However, fabrication of high Q micro-rings such as the micro-rings 14, 16 cannot, at present, easily match exactly in their resonant wavelengths due to limited precision in nanofabrication. Accordingly, in an alternative embodiment, one of the micro-rings is fabricated to be slightly smaller than the other, and then heated with a resistive micro-heater formed on the substrate 12, to match the resonant frequencies.

Figure 5:
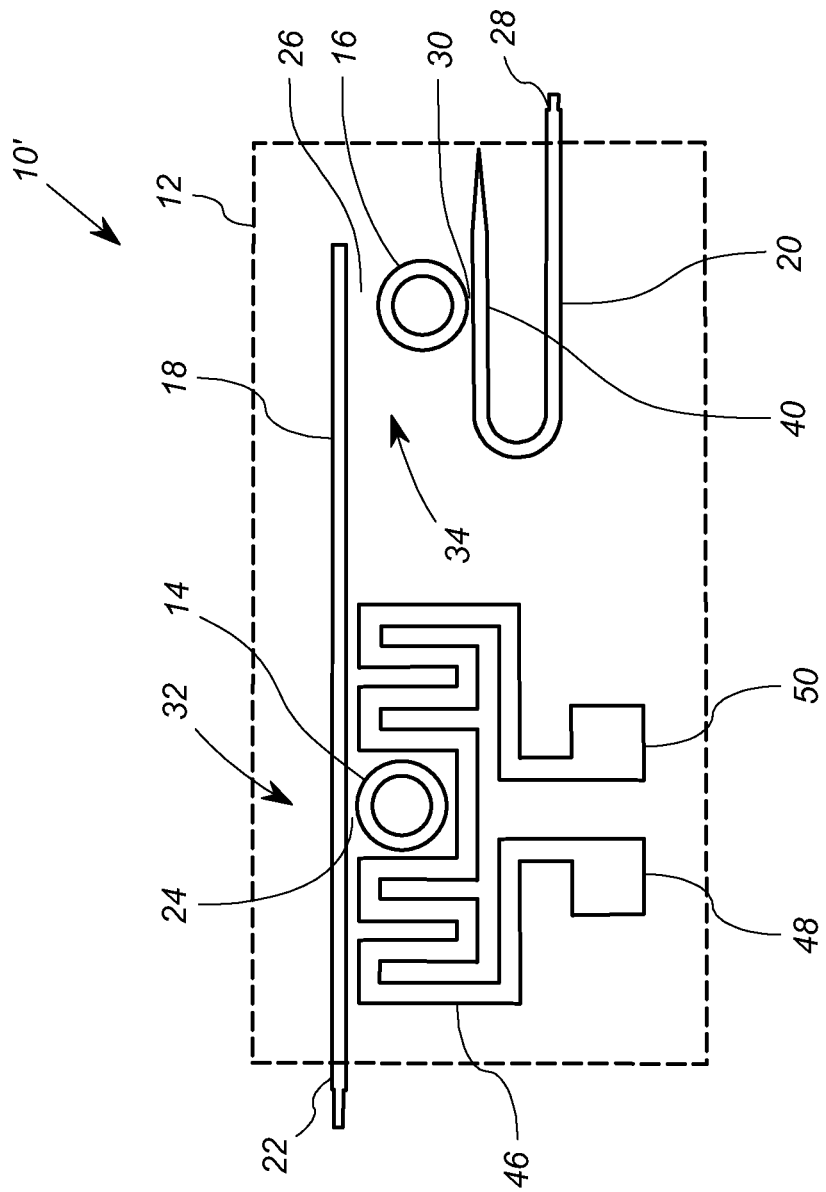
FIG. 5 shows fragmentary top plan view of an alternative embodiment of the optical component of FIG. 1.

Specifically, FIG. 5 shows a schematic diagram of an alternative device 10' having the same elements as the optical device 10, with the exception that the optical device 10' includes an titanium micro-heater 46 disposed on the semiconductor substrate 12 adjacent to the notch filter 32. The titanium micro-heater 46 comprises a conductive/resistive strip line that surrounds the first micro-ring 14 on multiple sides, while simultaneously being further spaced apart from the second micro-ring 16. The micro-heater 46 is further spaced apart from the second micro-ring 16 to avoid affecting the response of the second micro-ring 16. The micro-heater 46 is connected at one end to a first contact pad 48 and at the other end to a second contact pad 50. When voltage (i.e. current) is applied across the first and second contact pads 48, 50, the micro-heater 46 generates $I^2R$ energy in the form of heat, which radiates to the first micro-ring 14.

In practice, the first micro-ring 14 in the optical device 10' is formed to have a radius that is slightly smaller than that of the second micro-ring 16. The first micro-ring 14 is formed smaller to ensure that the correction by heating, which can only increase the resonant wavelength of the notch filter 32, will bring the resonant wavelengths of the micro-rings 14 and 16 in tune with each other. In this embodiment, the first micro-ring 14 is formed with a target radius of 5.000 µM and the second micro-ring 16 is formed with a target radius of 5.002 µM.

Figure 6:
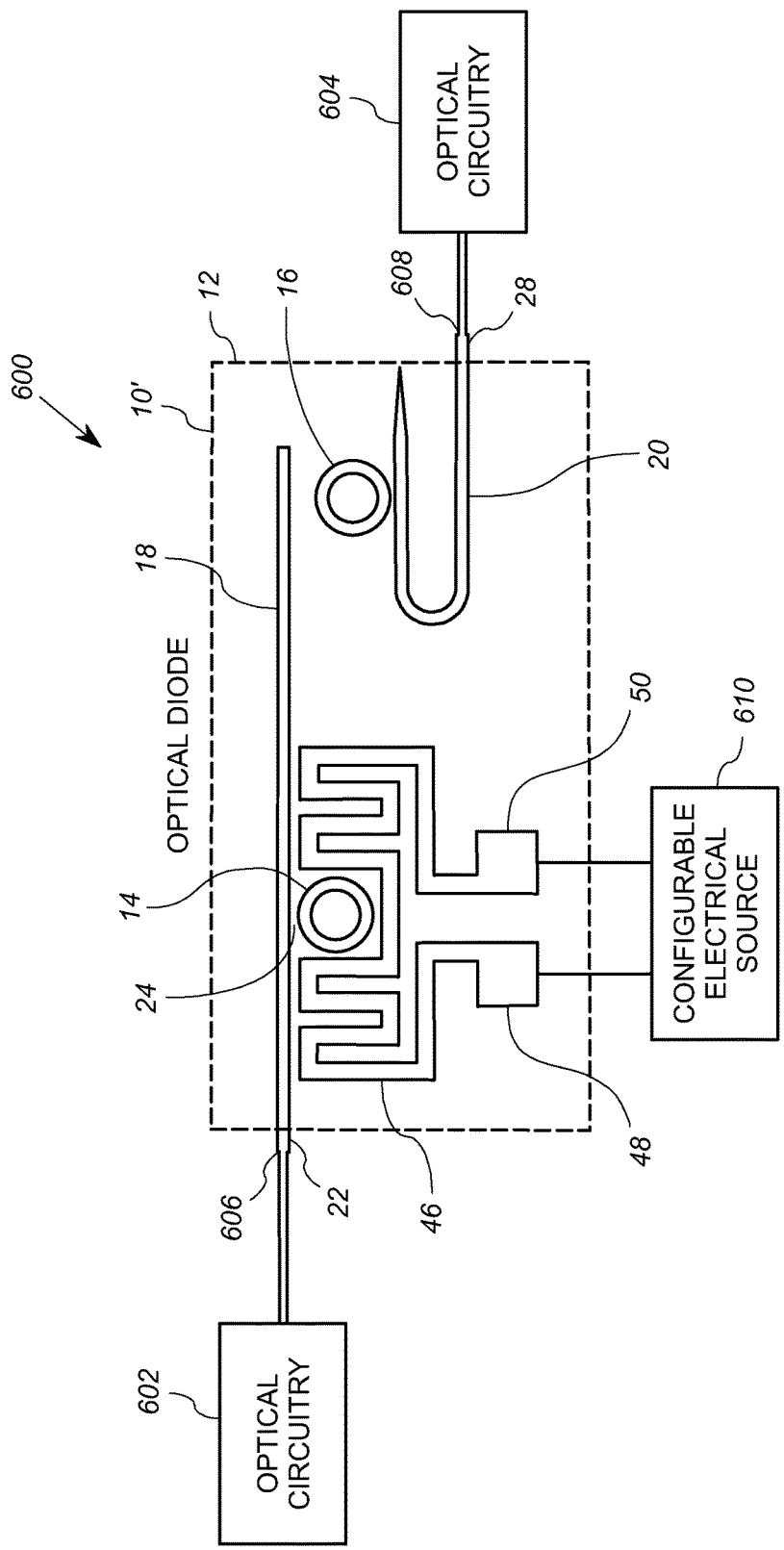
FIG. 6 shows a schematic diagram of an optical circuit incorporating the optical component of FIG. 5.

FIG. 6 shows a schematic diagram of the optical device 10' employed in an optical circuit 600. The optical circuit 600 includes a first optical circuit portion 602 and a second optical circuit portion 604, with the optical device 10' optically coupled therebetween. To this end, each of the first optical circuit portion 602 and the second optical circuit portion 604 includes one or more optical components that carry out functions, for example, in transmitting and/or otherwise manipulating data signals. The first optical circuit portion 602 includes a first port 606 operably coupled to the input port 22 of the optical device 10', and the second optical circuit portion 604 includes a second port 608 operably coupled to the output port 28 of the optical device 10'.

In this embodiment, the optical circuit 600 is configured to allow optical signals at a wavelength of interest, e.g. the wavelength $\lambda_0$, to propagate from the first optical circuit portion 602 to the second optical circuit portion 604. However, the optical circuit 600, by action of the optical device 10' more highly attenuates optical signals at the wavelength of interest that propagate from the second optical circuit portion 604 to the first optical circuit portion 602. In many cases the amount of attenuation is sufficient to effectively block the optical signal in the reverse bias direction.

As shown in FIG. 6, the pads 48, 50 of the optical device 10' are electrically coupled to a configurable electrical source 610. The configurable electrical source 610 is configured to provide a current between the contacts 48 and 50 sufficient to cause the micro-heater 46 to heat the first micro-ring 14 as necessary to achieve a resonant wavelength that matches that of the second micro-ring 16 in the manner discussed above. The configurable electrical source 610 is configurable to provide the specific amount of current necessary to adjust the resonant wavelength of the first micro-ring 14 based on any manufacturing variances in the first and second micro-rings 14, 16.

It will be appreciated that while the first optical circuit portion 602, the second optical circuit portion 604, and the electrical source 610 are all shown as being independent of the substrate 12, all or a part of any of those elements may also be formed or disposed on the substrate 12. It will be noted that because the optical device 10' is formed on the semiconductor substrate 12, it may be incorporated in an integrated circuit formed on the semiconductor substrate 12 that includes electrical components, even including microprocessors, memories and the like.

Fabrication

The optical devices 10, 10' in an exemplary embodiment, can be fabricated from an SOI wafer having 250 nm thick top silicon layer and 3 µm buried oxide. The optical device 10, including the micro-rings 14, 16 and the waveguides 18, 20 was patterned using high resolution electron-beam lithography, having a beam step size of 2 nm. Thereafter, the micro-rings 14, 16 and waveguides 18, 20 were formed after reactive-ion etching with a chlorine-argon gas mixture in an inductively coupled plasma tool. No cladding was applied. In the case of the optical device 10', the titanium micro-heater 46 subsequently evaporated on top of the buried oxide next to only the notch filter micro-ring 32.

It will be appreciated that placement of the titanium micro-heater 46 beside the first micro-ring 14, instead of above the micro-ring 14, preserves the high Q of the notch filter micro-ring 14, even though heating efficiency is somewhat compromised. It will further be appreciated that employing separately actuated micro-heaters for the notch filter micro-ring 14 and the second micro-ring 16 provides the possibility making the entire optical device 10 tunable to other resonant wavelengths. In addition, alternative devices may of course be fabricated with micro-rings 14, 16 of larger or smaller radii, and corresponding larger or smaller gap sizes, to accommodate different wavelengths of interest.

It will also be appreciated that the optical diode 10 can be realized in materials other than silicon. For example, the optical diode 19 can be fabricated using any material that can allow light to be confined in it and manipulated, including other semiconductors such as germanium, gallium arsenide, indium arsenide, oxides like titanium dioxides, silicon nitrides and other high refractive index materials. It will also be appreciated that while FIGS. 1 and 5 show two optical cavities or traps (i.e. micro-ring resonators 14, 16), any number of optical cavities could be cascaded to the system to increase the efficiency of the performance as long as they all behave in the same manner as the notch filter 32 (forward propagating light is not attenuated since it is not falling in the resonance while backward propagating light falls into the resonance which kills the light).

It will be appreciated that the above described embodiments are merely exemplary, and that those of ordinary skill in the art may readily devise their own implementations and modifications that incorporate the principles of the present invention and fall within the spirit and scope thereof.

We claim:

1. A method of fabricating an optical device, comprising:
   forming a first optical cavity formed on a semiconductor substrate, the first optical cavity configured to store light;
   forming a second optical cavity on the semiconductor substrate, the second optical cavity configured to store light;
   forming a first light guide on the semiconductor substrate, the first light guide having an input, the first light guide optically coupled to the first optical cavity by a first coupling strength, the first light guide optically coupled to the second optical cavity by a second coupling strength; and
   forming a second light guide on the semiconductor substrate, the second light guide having an output, the second light guide coupled to the second optical cavity by a third coupling strength;
   wherein the first coupling strength is greater than the second coupling strength, and the third coupling strength is greater than the second coupling strength.

2. The method of claim 1, wherein forming the first optical cavity comprises forming a first optical resonator, and wherein forming the second optical cavity comprises forming a second optical resonator.

3. The method of claim 2, wherein forming the first optical cavity further comprises forming the first optical resonator of single crystal silicon on an $SiO_2$ substrate.

4. The method of claim 3, wherein forming the first optical resonator further comprises patterning the optical resonator using electron-beam lithography, and reactive ion-etching.

5. The method of claim 2, wherein the first optical resonator and the second optical resonator have substantially identical resonant wavelengths for a given optical power within the cavity.

6. The method of claim 2, wherein forming the first light guide comprises forming a first waveguide and wherein forming the second light guide comprises forming a second waveguide.

7. The method of claim 6, wherein forming the first light guide comprises forming the first waveguide of single crystal silicon on an $SiO_2$ substrate.

8. The method claim 6, wherein the first waveguide is separated from the second optical resonator by a first gap having a first gap width, the second waveguide is separated is separated from the second optical resonator by a second gap having a second gap width, and the first gap width is greater than the second gap width.

9. The method of claim 8, wherein the first waveguide is separated from the first resonator by a third gap having a third gap width, and the first gap width is greater than the third gap width.

10. The method of claim 6, wherein the first waveguide is separated from the second optical resonator by a first gap, the second waveguide is separated is separated from the second optical resonator by a second gap, and wherein a first refractive index of the first waveguide proximate the first gap is different from a second refractive index of the second waveguide proximate the second gap.

11. The method of claim 1, further comprising forming a micro-heater on the semiconductor substrate such that the micro-heater is closer to the first optical cavity than to the second optical cavity.

12. The method of claim 11, wherein forming the micro-heater further comprises evaporating titanium onto a buried oxide layer proximate the first optical resonator.

13. A method of fabricating an optical device, comprising:
    forming an optical cavity on the semiconductor substrate, the optical cavity configured to store light;
    forming on the semiconductor substrate a first light guide having an input, the first light guide optically coupled to the optical cavity by a first coupling strength, the first light guide having an input coupling; and
    forming on the semiconductor substrate a second light guide having an output coupling, the second light guide optically coupled to the optical cavity by a second coupling strength;
    wherein the second coupling strength is greater than the first coupling strength, and wherein the optical cavity, the first light guide and the second light guide are formed such that a first wavelength of light propagates from the input coupling to the output coupling with a first attenuation, and the first wavelength of light propagates from the output coupling to the input coupling with a second attenuation that is greater than the first attenuation.

14. The method of claim 13, wherein the optical cavity comprises an optical trap.

15. The method of claim 13, wherein the optical resonator comprises a micro-ring resonator.

16. A method of using an optical device, comprising:
    receiving an optical signal at a first light guide via a first input coupling, the first light guide coupled to an optical cavity by a first coupling strength, the optical cavity disposed on a semiconductor substrate and configured to store light;
    coupling the optical signal from first light guide to the optical cavity;
    coupled the optical signal from the optical cavity to a second light guide, the second light guide coupled to the optical cavity by a second coupling strength, the second light guide having an output coupling;
    wherein the second coupling strength is greater than the first coupling strength, and wherein the optical device is configured such that a first wavelength of light propagates from the input coupling to the output coupling with a first attention, and the first wavelength of light propagates from the output coupling to the input coupling with a second attenuation that is greater than the first attenuation.

17. The method of claim 16, further comprising passing the received optical signal through a notch filter formed by a part of the first light guide coupled to a further optical cavity by a third coupling strength, wherein the third coupling strength is greater than the first coupling strength.

18. The method of claim 17, wherein the optical cavity and the further optical cavity have substantially identical resonant wavelengths for a given optical power within the cavity.

19. The method of claim 17, further comprising applying current to a micro-heater, the microheater configured to heat the further optical cavity more than the optical cavity.

20. The method of claim 17, wherein the further optical cavity is disposed on the semiconductor substrate, and further comprising applying the received optical signal to the first light guide at a power level at which the further optical cavity heats the semiconductor substrate sufficiently to change a resonant wavelength of the further optical cavity.

\* \* \* \* \*